United States Patent
Hooper et al.

(10) Patent No.: US 8,388,919 B2
(45) Date of Patent: Mar. 5, 2013

(54) PLANT AND PROCESS FOR REMOVING CARBON DIOXIDE FROM GAS STREAMS

(75) Inventors: Barry Hooper, Melbourne (AU); Geoff Stevens, Melbourne (AU); Sandra Kentish, Melbourne (AU)

(73) Assignee: CO2CRC Technologies Pty Ltd, Parkville, Victoria (AU)

( * ) Notice: Subject to any disclaimer, the term of this patent is extended or adjusted under 35 U.S.C. 154(b) by 0 days.

(21) Appl. No.: 13/089,952

(22) Filed: Apr. 19, 2011

(65) Prior Publication Data

US 2011/0195005 A1    Aug. 11, 2011

Related U.S. Application Data

(62) Division of application No. 12/063,930, filed as application No. PCT/AU2006/001177 on Aug. 16, 2006, now Pat. No. 7,976,803.

(60) Provisional application No. 60/709,410, filed on Aug. 18, 2005.

(30) Foreign Application Priority Data

Aug. 16, 2005    (AU) ................................ 2005904432

(51) Int. Cl.
  *B01D 53/62* (2006.01)
  *B01D 53/48* (2006.01)
  *B01D 53/54* (2006.01)

(52) U.S. Cl. ............ 423/232; 423/220; 165/58; 165/60; 165/104.11; 165/104.21

(58) Field of Classification Search ................ 423/220, 423/232; 422/198; 165/58, 60, 104.11, 104.21; 122/4 D, 7 D, 7 R
See application file for complete search history.

(56) References Cited

U.S. PATENT DOCUMENTS

| | | | |
|---|---|---|---|
| 3,101,996 A | 8/1963 | Bresler et al. | |
| 3,823,222 A | 7/1974 | Benson | |
| 4,160,810 A | 7/1979 | Benson et al. | |
| 4,528,811 A | 7/1985 | Stahl | |
| 6,312,655 B1 * | 11/2001 | Hesse et al. | 423/232 |
| 7,976,803 B2 * | 7/2011 | Hooper et al. | 423/220 |
| 2004/0265199 A1 | 12/2004 | MacKnight | |
| 2006/0236735 A1 | 10/2006 | Johnson et al. | |

FOREIGN PATENT DOCUMENTS

| | | |
|---|---|---|
| EP | 1 277 699 | 4/2005 |
| GB | 867574 | 5/1961 |
| WO | WO 94/01203 | 1/1994 |
| WO | WO 95/21683 | 8/1995 |

* cited by examiner

*Primary Examiner* — Daniel C McCracken
*Assistant Examiner* — Daniel Berns
(74) *Attorney, Agent, or Firm* — Merchant & Gould P.C.

(57) ABSTRACT

The present invention is based on the realization that the carbon dioxide component of industrial gas streams also containing steam can be processed so to utilize either as latent and/or sensible heat the heat available from the steam component to assist in separating carbon dioxide from the remainder of the gas stream. For example, flue gases produced by power stations burning brown coal, black coal or natural gas inherently contain a useful amount of energy that can be harnessed according to the present invention. According to particular preferred forms of the invention, nitrogen and sulphur constituent such as $SO_x$ and $NO_x$, $H_2S$ and other nitrogen containing compounds may also be removed from the gas stream through direct contact with the absorbing medium and used to produce by-products such as fertilizer material.

26 Claims, 11 Drawing Sheets

Figure 4

| STREAM | | CCO2 | CCO2G1 | CCO2H1 | FGAS1 | FGAS2 | FGAS3 | FGAS4 | FGASH | MKUPH2O |
|---|---|---|---|---|---|---|---|---|---|---|
| Temperature | [C] | 68.8 | 53.6 | 53.6 | 170.0 | 185.0 | 92.5 | 50.0 | 50.0 | 30.0 |
| Pressure | [bar] | 0.3 | 0.3 | 0.3 | 1.0 | 1.1 | 1.1 | 1.1 | 1.1 | 1.0 |
| Mole Flow | [kmol/hr] | 43540 | 22954 | 20586 | 103262 | 103262 | 103262 | 87020 | 16242 | 43557 |
| Mass Flow | [kg/hr] | 1086420 | 715524 | 370896 | 2839000 | 2839000 | 2839000 | 2546370 | 292629 | 784696 |
| Volume Flow | [cum/hr] | 4115430 | 2074770 | 376 | 3754410 | 3533100 | 2815410 | 2097620 | 296 | 788 |
| Enthalpy | [GJ/hr] | -12234 | -7294 | -5844 | -10889 | -10839 | -11147 | -7368 | -4615 | -12441 |
| Mass Fraction | | | | | | | | | | |
| $H_2O$ | | 0.5293 | 0.2854 | 0.9999 | 0.1649 | 0.1649 | 0.1649 | 0.0690 | 0.9998 | 1.0000 |
| $CO_2$ | | 0.4706 | 0.7146 | 0.0001 | 0.1998 | 0.1998 | 0.1998 | 0.2227 | 0.0001 | 0.0000 |
| $N_2$ | | 0.0001 | 0.0001 | 0.0000 | 0.6353 | 0.6353 | 0.6353 | 0.7083 | 0.0000 | 0.0000 |
| $K^+$ | | 0.0000 | 0.0000 | 0.0000 | 0.0000 | 0.0000 | 0.0000 | 0.0000 | 0.0000 | 0.0000 |
| $HCO_3^-$ | | 0.0000 | 0.0000 | 0.0000 | 0.0000 | 0.0000 | 0.0000 | 0.0000 | 0.0000 | 0.0000 |
| $OH^-$ | | 0.0000 | 0.0000 | 0.0000 | 0.0000 | 0.0000 | 0.0000 | 0.0000 | 0.0000 | 0.0000 |
| $CO_3^{--}$ | | 0.0000 | 0.0000 | 0.0000 | 0.0000 | 0.0000 | 0.0000 | 0.0000 | 0.0000 | 0.0000 |

| STREAM | | SOL1 | SOL2 | SOL3 | SOL4 | SOL5 | SOL6 | SOL7 | SOL8 | SOL9 | TFGAS |
|---|---|---|---|---|---|---|---|---|---|---|---|
| Temperature | [C] | 60.0 | 63.3 | 81.5 | 68.1 | 82.4 | 82.5 | 91.5 | 69.9 | 67.9 | 71.3 |
| Pressure | [bar] | 1.0 | 1.1 | 1.1 | 0.3 | 0.4 | 1.0 | 1.0 | 1.0 | 1.0 | 1.0 |
| Mole Flow | [kmol/hr] | 676785 | 665163 | 665188 | 668234 | 633229 | 633229 | 633231 | 633228 | 676786 | 87058 |
| Mass Flow | [kg/hr] | 15238300 | 15539100 | 15539100 | 15539100 | 14452700 | 14452700 | 14452700 | 14452700 | 15237400 | 2245570 |
| Volume Flow | [cum/hr] | 11961 | 12124 | 12320 | 1028850 | 11327 | 11326 | 11397 | 11237 | 12013 | 2444120 |
| Enthalpy | [GJ/hr] | -204349 | -206154 | -205428 | -205428 | -191198 | -191197 | -190889 | -191615 | -204056 | -5562 |
| Mass Fraction | | | | | | | | | | | |
| $H_2O$ | | 0.6766 | 0.6366 | 0.6367 | 0.6402 | 0.6591 | 0.6591 | 0.6591 | 0.6591 | 0.6767 | 0.1716 |
| $CO_2$ | | 0.0000 | 0.0000 | 0.0001 | 0.0087 | 0.0000 | 0.0000 | 0.0000 | 0.0000 | 0.0000 | 0.0253 |
| $N_2$ | | 0.0000 | 0.0000 | 0.0000 | 0.0000 | 0.0000 | 0.0000 | 0.0000 | 0.0000 | 0.0000 | 0.8032 |
| $K^+$ | | 0.1662 | 0.1629 | 0.1629 | 0.1629 | 0.1752 | 0.1752 | 0.1752 | 0.1752 | 0.1662 | 0.0000 |
| $HCO_3^-$ | | 0.0584 | 0.1482 | 0.1480 | 0.1241 | 0.0615 | 0.0615 | 0.0616 | 0.0615 | 0.0583 | 0.0000 |
| $OH^-$ | | 0.0000 | 0.0000 | 0.0000 | 0.0000 | 0.0001 | 0.0001 | 0.0001 | 0.0000 | 0.0000 | 0.0000 |
| $CO_3^{--}$ | | 0.0987 | 0.0522 | 0.0523 | 0.0640 | 0.1041 | 0.1041 | 0.1041 | 0.1042 | | |
| LLOAD | | 0.225 | 0.583 | 0.582 | 0.488 | 0.225 | 0.225 | 0.225 | 0.225 | 0.225 | |

Figure 6

| STREAM | | CCO2 | CCO2G1 | CCO2G1A | CCO2GC | CCO2H1 | FGAS1 | FGAS2 | FGAS3 | FGAS4 | FGASH |
|---|---|---|---|---|---|---|---|---|---|---|---|
| Temperature | [C] | 67.1 | 51.8 | 154.3 | 40.0 | 51.8 | 170.0 | 185.0 | 102.4 | 50.0 | 50.0 |
| Pressure | [bar] | 0.3 | 0.3 | 0.8 | 100.0 | 0.3 | 1.0 | 1.1 | 1.1 | 1.1 | 1.1 |
| Mole Flow | [kmol/hr] | 36330 | 21175 | 21175 | 11620 | 15156 | 103262 | 103262 | 103262 | 87020 | 16242 |
| Mass Flow | [kg/hr] | 956542 | 683489 | 683489 | 511352 | 273053 | 2839000 | 2839000 | 2839000 | 2546370 | 292629 |
| Volume Flow | [cum/hr] | 3415530 | 1903200 | 950404 | 1001 | 277 | 3754410 | 3533100 | 2892750 | 2097620 | 296 |
| Enthalpy | [GJ/hr] | -10502 | -6867 | -6786 | -4568 | -4304 | -10889 | -10839 | -11114 | -7368 | -4615 |
| Mass Fraction | | | | | | | | | | | |
| H2O | | 0.4654 | 0.2518 | 0.2518 | 0.0000 | 0.9999 | 0.1649 | 0.1649 | 0.1649 | 0.0690 | 0.9998 |
| CO2 | | 0.5346 | 0.7481 | 0.7481 | 0.9999 | 0.0001 | 0.1998 | 0.1998 | 0.1998 | 0.2227 | 0.0001 |
| N2 | | 0.0001 | 0.0001 | 0.0001 | 0.0001 | 0.0000 | 0.6353 | 0.6353 | 0.6353 | 0.7083 | 0.0000 |
| K+ | | 0.0000 | 0.0000 | 0.0000 | 0.0000 | 0.0000 | 0.0000 | 0.0000 | 0.0000 | 0.0000 | 0.0000 |
| HCO3- | | 0.0000 | 0.0000 | 0.0000 | 0.0000 | 0.0000 | 0.0000 | 0.0000 | 0.0000 | 0.0000 | 0.0000 |
| OH- | | 0.0000 | 0.0000 | 0.0000 | 0.0000 | 0.0000 | 0.0000 | 0.0000 | 0.0000 | 0.0000 | 0.0000 |
| CO3-- | | 0.0000 | 0.0000 | 0.0000 | 0.0000 | 0.0000 | 0.0000 | 0.0000 | 0.0000 | 0.0000 | 0.0000 |

| STREAM | | MKUPH2O | SOL1 | SOL2 | SOL3 | SOL4 | SOL5 | SOL6 | SOL7 | SOL8 | TFGAS |
|---|---|---|---|---|---|---|---|---|---|---|---|
| Temperature | [C] | 30.0 | 60.0 | 63.3 | 72.3 | 66.0 | 82.3 | 82.3 | 71.8 | 70.0 | 71.3 |
| Pressure | [bar] | 1.0 | 1.0 | 1.1 | 1.1 | 0.3 | 0.4 | 1.0 | 1.0 | 1.0 | 1.0 |
| Mole Flow | [kmol/hr] | 36347 | 676785 | 665163 | 665173 | 666860 | 640439 | 640439 | 640432 | 676780 | 87058 |
| Mass Flow | [kg/hr] | 654807 | 15238300 | 15539100 | 15539100 | 15539100 | 14582600 | 14582600 | 14582500 | 15237300 | 2245570 |
| Volume Flow | [cum/hr] | 658 | 11961 | 12124 | 12203 | 468926 | 11457 | 11457 | 11381 | 12027 | 2444120 |
| Enthalpy | [GJ/hr] | -10382 | -204349 | -206154 | -205797 | -205797 | -193242 | -193242 | -193597 | -203979 | -5562 |
| Mass Fraction | | | | | | | | | | | |
| H2O | | 1.0000 | 0.6766 | 0.6366 | 0.6366 | 0.6386 | 0.6622 | 0.6622 | 0.6622 | 0.6767 | 0.1716 |
| CO2 | | 0.0000 | 0.0000 | 0.0000 | 0.0001 | 0.0048 | 0.0000 | 0.0000 | 0.0000 | 0.0000 | 0.0253 |
| N2 | | 0.0000 | 0.0000 | 0.0000 | 0.0000 | 0.0000 | 0.0000 | 0.0000 | 0.0000 | 0.0000 | 0.8032 |
| K+ | | 0.0000 | 0.1662 | 0.1629 | 0.1629 | 0.1629 | 0.1736 | 0.1736 | 0.1736 | 0.1662 | 0.0000 |
| HCO3- | | 0.0000 | 0.0584 | 0.1482 | 0.1481 | 0.1349 | 0.0610 | 0.0610 | 0.0609 | 0.0583 | 0.0000 |
| OH- | | 0.0000 | 0.0000 | 0.0000 | 0.0000 | 0.0000 | 0.0001 | 0.0001 | 0.0000 | 0.0000 | 0.0000 |
| CO3-- | | 0.0000 | 0.0987 | 0.0522 | 0.0522 | 0.0587 | 0.1032 | 0.1032 | 0.1032 | 0.0988 | 0.0000 |
| LLOAD | | | 0.225 | 0.583 | 0.582 | 0.530 | 0.225 | 0.225 | 0.225 | 0.225 | |

Figure 8

| STREAM | | CCO2 | CCO2G | CCO2W1 | CCO2W2 | FGAS1 | FGAS2 | MKUPH2O | SOL1 | SOL2 | SOL3 |
|---|---|---|---|---|---|---|---|---|---|---|---|
| Temperature | [C] | 71.2 | 48.6 | 48.6 | 48.6 | 170.0 | 185.0 | 30.0 | 55.0 | 78.5 | 78.5 |
| Pressure | [bar] | 0.3 | 0.3 | 0.3 | 1.0 | 1.0 | 1.1 | 1.0 | 1.0 | 1.1 | 1.1 |
| Mole Flow | [kmol/hr] | 63170 | 18905 | 44264 | 44264 | 103262 | 103262 | 0 | 972940 | 980244 | 980244 |
| Mass Flow | [kg/hr] | 1440330 | 642821 | 797513 | 797513 | 2839000 | 2839000 | 1 | 21906500 | 22548100 | 22548100 |
| Volume Flow | [cum/hr] | 6007490 | 1682490 | 807 | 807 | 3803230 | 3455870 | 0 | 17151 | 17874 | 17874 |
| Enthalpy | [GJ/hr] | -4049 | -1510 | -3005 | -3005 | -2601 | -2601 | 0 | -70227 | -71651 | -71651 |
| Mass Fraction | | | | | | | | | | | |
| $H_2O$ | | 0.6446 | 0.2039 | 0.9998 | 0.9998 | 0.1649 | 0.1649 | 1.0000 | 0.6766 | 0.6540 | 0.6540 |
| $CO_2$ | | 0.3553 | 0.7960 | 0.0002 | 0.0002 | 0.1998 | 0.1998 | 0.0000 | 0.0000 | 0.0000 | 0.0000 |
| $N_2$ | | 0.0000 | 0.0001 | 0.0000 | 0.0000 | 0.6353 | 0.6353 | 0.0000 | 0.0000 | 0.0000 | 0.0000 |
| $K^+$ | | 0.0000 | 0.0000 | 0.0000 | 0.0000 | 0.0000 | 0.0000 | 0.0000 | 0.1662 | 0.1614 | 0.1614 |
| $HCO_3^-$ | | 0.0000 | 0.0000 | 0.0000 | 0.0000 | 0.0000 | 0.0000 | 0.0000 | 0.0584 | 0.1194 | 0.1194 |
| $OH^-$ | | 0.0000 | 0.0000 | 0.0000 | 0.0000 | 0.0000 | 0.0000 | 0.0000 | 0.0000 | 0.0000 | 0.0000 |
| $CO_3^{--}$ | | 0.0000 | 0.0000 | 0.0000 | 0.0000 | 0.0000 | 0.0000 | 0.0000 | 0.0987 | 0.0652 | 0.0652 |
| LLOAD | | | | | | | | | 0.225 | 0.474 | 0.474 |
| STREAM | | SOL4 | SOL5 | SOL6 | TFGAS | | | | | | |
| Temperature | [C] | 82.2 | 82.2 | 81.2 | 68.6 | | | | | | |
| Pressure | [bar] | 0.4 | 1.0 | 1.0 | 1.0 | | | | | | |
| Mole Flow | [kmol/hr] | 928684 | 928684 | 972945 | 84381 | | | | | | |
| Mass Flow | [kg/hr] | 21107800 | 21107800 | 21905300 | 2197340 | | | | | | |
| Volume Flow | [cum/hr] | 16616 | 16616 | 17412 | 2358870 | | | | | | |
| Enthalpy | [GJ/hr] | -66894 | -66893 | -69899 | -1176 | | | | | | |
| Mass Fraction | | | | | | | | | | | |
| $H_2O$ | | 0.6645 | 0.6645 | 0.6767 | 0.1534 | | | | | | |
| $CO_2$ | | 0.0000 | 0.0000 | 0.0000 | 0.0258 | | | | | | |
| $N_2$ | | 0.0000 | 0.0000 | 0.0000 | 0.8208 | | | | | | |
| $K^+$ | | 0.1725 | 0.1725 | 0.1662 | 0.0000 | | | | | | |
| $HCO_3^-$ | | 0.0606 | 0.0606 | 0.0584 | 0.0000 | | | | | | |
| $OH^-$ | | 0.0001 | 0.0001 | 0.0001 | 0.0000 | | | | | | |
| $CO_3^{--}$ | | 0.1025 | 0.1025 | 0.0987 | 0.0000 | | | | | | |
| LLOAD | | 0.225 | 0.2 | 0.2 | | | | | | | |

Figure 10

| STREAM | | CCO2 | CCO2G | CCO2W1 | CCO2W2 | FGAS2 | HPS1 | HPS2 | HPS3 | HPS4 | SOL1 | SOL2 |
|---|---|---|---|---|---|---|---|---|---|---|---|---|
| Temperature | [C] | 68.3 | 50.4 | 50.4 | 50.4 | 185.0 | 49.4 | 316.0 | 92.1 | 49.4 | 55.0 | 67.1 |
| Pressure | [bar] | 0.3 | 0.3 | 0.3 | 1.0 | 1.1 | 0.1 | 0.8 | 0.8 | 0.1 | 1.0 | 1.1 |
| Mole Flow | [kmol/hr] | 41847 | 20076 | 21771 | 21771 | 103262 | 22897 | 22897 | 22897 | 22897 | 706363 | 2382770 |
| Mass Flow | [kg/hr] | 1056020 | 663777 | 392244 | 392244 | 2839000 | 412500 | 412500 | 412500 | 412500 | 15904300 | 55223700 |
| Volume Flow | [cum/hr] | 3943040 | 1796640 | 397 | 397 | 3455870 | 5110310 | 1332870 | 428 | 383893 | 12452 | 43464 |
| Enthalpy | [GJ/hr] | -2825 | -1577 | -1477 | -1477 | -2601 | -1319 | -1268 | -1536 | -1536 | -50985 | -175650 |
| Mass Fraction | | | | | | | | | | | | |
| H2O | | 0.5156 | 0.2294 | 0.9998 | 0.9998 | 0.1649 | 1.0000 | 1.0000 | 1.0000 | 1.0000 | 0.6766 | 0.6462 |
| CO2 | | 0.4844 | 0.7705 | 0.0001 | 0.0001 | 0.1998 | 0.0000 | 0.0000 | 0.0000 | 0.0000 | 0.0000 | 0.0000 |
| N2 | | 0.0001 | 0.0001 | 0.0000 | 0.0000 | 0.6353 | 0.0000 | 0.0000 | 0.0000 | 0.0000 | 0.0000 | 0.0000 |
| K+ | | 0.0000 | 0.0000 | 0.0000 | 0.0000 | 0.0000 | 0.0000 | 0.0000 | 0.0000 | 0.0000 | 0.1662 | 0.1595 |
| HCO3- | | 0.0000 | 0.0000 | 0.0000 | 0.0000 | 0.0000 | 0.0000 | 0.0000 | 0.0000 | 0.0000 | 0.0584 | 0.1413 |
| OH- | | 0.0000 | 0.0000 | 0.0000 | 0.0000 | 0.0000 | 0.0000 | 0.0000 | 0.0000 | 0.0000 | 0.0000 | 0.0000 |
| CO3-- | | 0.0000 | 0.0000 | 0.0000 | 0.0000 | 0.0000 | 0.0000 | 0.0000 | 0.0000 | 0.0000 | 0.0987 | 0.0529 |
| LLOAD | | | | | | | | | | | 0.2 | 0.6 |

| STREAM | | SOL3 | SOL4 | SOL5 | SOL6 | SOL7 | SOL8 | SOL9 | SOL10 | SOL11 | TFGAS |
|---|---|---|---|---|---|---|---|---|---|---|---|
| Temperature | [C] | 67.1 | 67.1 | 57.9 | 67.1 | 72.1 | 82.1 | 82.1 | 76.3 | 75.9 | 67.6 |
| Pressure | [bar] | 1.1 | 1.1 | 1.1 | 1.1 | 1.1 | 0.4 | 1.0 | 1.0 | 1.0 | 1.0 |
| Mole Flow | [kmol/hr] | 2382770 | 1667940 | 1667890 | 714830 | 714836 | 684591 | 684591 | 684591 | 706360 | 83211 |
| Mass Flow | [kg/hr] | 55223700 | 38656600 | 38656600 | 16567100 | 16567100 | 15511100 | 15511100 | 15511100 | 15903300 | 2176210 |
| Volume Flow | [cum/hr] | 43464 | 30426 | 30272 | 13040 | 13089 | 12251 | 12251 | 12205 | 12598 | 2327960 |
| Enthalpy | [GJ/hr] | -175650 | -122950 | -123170 | -52694 | -52643 | -49267 | -49267 | -49318 | -50795 | -1110 |
| Mass Fraction | | | | | | | | | | | |
| H2O | | 0.6462 | 0.6462 | 0.6462 | 0.6462 | 0.6462 | 0.6685 | 0.6685 | 0.6685 | 0.6767 | 0.1452 |
| CO2 | | 0.0000 | 0.0000 | 0.0000 | 0.0000 | 0.0001 | 0.0000 | 0.0000 | 0.0000 | 0.0000 | 0.0260 |
| N2 | | 0.0000 | 0.0000 | 0.0000 | 0.0000 | 0.0000 | 0.0000 | 0.0000 | 0.0000 | 0.0000 | 0.8288 |
| K+ | | 0.1595 | 0.1595 | 0.1595 | 0.1595 | 0.1595 | 0.1704 | 0.1704 | 0.1704 | 0.1662 | 0.0000 |
| HCO3- | | 0.1413 | 0.1413 | 0.1413 | 0.1413 | 0.1413 | 0.0598 | 0.0598 | 0.0598 | 0.0583 | 0.0000 |
| OH- | | 0.0000 | 0.0000 | 0.0000 | 0.0000 | 0.0000 | 0.0001 | 0.0001 | 0.0000 | 0.0000 | 0.0000 |
| CO3-- | | 0.0529 | 0.0529 | 0.0529 | 0.0529 | 0.0529 | 0.1012 | 0.1012 | 0.1013 | 0.0988 | 0.0000 |
| LLOAD | | 0.6 | 0.6 | 0.568 | 0.568 | 0.568 | 0.225 | 0.225 | 0.225 | 0.225 | |

Figure 12

| STREAM | | CCO2 | CCO2G | CCO2H1 | CCO2H2 | FGAS | SOL1 | SOL4 | SOL5 | SOL6 |
|---|---|---|---|---|---|---|---|---|---|---|
| Temperature | [C] | 138.8 | 100.0 | 100.0 | 100.3 | 250.0 | 135.0 | 147.0 | 147.7 | 145.7 |
| Pressure | [bar] | 3.0 | 3.0 | 3.0 | 25.0 | 25.0 | 25.0 | 3.0 | 25.0 | 25.0 |
| Mass Flow | [kg/hr] | 1041690 | 538171 | 503524 | 503524 | 1262000 | 10036500 | 9534630 | 9534630 | 10038200 |
| Enthalpy | [GJ/hr] | -11830 | -5196 | -7833 | -7831 | -6725 | -125307 | -117285 | -117266 | -125098 |
| Mass Fraction | | | | | | | | | | |
| H2O | | 0.5739 | 0.1761 | 0.9991 | 0.9991 | 0.1467 | 0.5717 | 0.5493 | 0.5493 | 0.5718 |
| CO2 | | 0.4257 | 0.8232 | 0.0009 | 0.0009 | 0.3899 | 0.0001 | 0.0002 | 0.0002 | 0.0001 |
| CO | | 0.0000 | 0.0001 | 0.0000 | 0.0000 | 0.0312 | 0.0000 | 0.0000 | 0.0000 | 0.0000 |
| CH4 | | 0.0000 | 0.0000 | 0.0000 | 0.0000 | 0.0153 | 0.0000 | 0.0000 | 0.0000 | 0.0000 |
| O2 | | 0.0000 | 0.0000 | 0.0000 | 0.0000 | 0.0010 | 0.0000 | 0.0000 | 0.0000 | 0.0000 |
| H2 | | 0.0000 | 0.0001 | 0.0000 | 0.0000 | 0.0238 | 0.0000 | 0.0000 | 0.0000 | 0.0000 |
| N2 | | 0.0003 | 0.0006 | 0.0000 | 0.0000 | 0.3921 | 0.0000 | 0.0000 | 0.0000 | 0.0000 |
| K+ | | 0.0000 | 0.0000 | 0.0000 | 0.0000 | 0.0000 | 0.2200 | 0.2316 | 0.2316 | 0.2200 |
| HCO3- | | 0.0000 | 0.0000 | 0.0000 | 0.0000 | 0.0000 | 0.0776 | 0.0814 | 0.0814 | 0.0776 |
| OH- | | 0.0000 | 0.0000 | 0.0000 | 0.0000 | 0.0000 | 0.0002 | 0.0002 | 0.0002 | 0.0002 |
| CO3-- | | 0.0000 | 0.0000 | 0.0000 | 0.0000 | 0.0000 | 0.1304 | 0.1373 | 0.1373 | 0.1302 |
| LLOAD | | | | | | | | 0.226 | 0.225 | 0.225 |
| STREAM | | SOL2 | SOL3 | TFGAS | | | | | | |
| Temperature | [C] | 165.0 | 137.7 | 144.9 | | | | | | |
| Pressure | [bar] | 25.0 | 3.0 | 25.0 | | | | | | |
| Mass Flow | [kg/hr] | 10576300 | 10576300 | 722145 | | | | | | |
| Enthalpy | [GJ/hr] | -130301 | -130301 | -1730 | | | | | | |
| Mass Fraction | | | | | | | | | | |
| H2O | | 0.5370 | 0.5431 | 0.1227 | | | | | | |
| CO2 | | 0.0057 | 0.0206 | 0.0681 | | | | | | |
| CO | | 0.0000 | 0.0000 | 0.0545 | | | | | | |
| CH4 | | 0.0000 | 0.0000 | 0.0267 | | | | | | |
| O2 | | 0.0000 | 0.0000 | 0.0018 | | | | | | |
| H2 | | 0.0000 | 0.0000 | 0.0415 | | | | | | |
| N2 | | 0.0000 | 0.0000 | 0.6848 | | | | | | |
| K+ | | 0.2088 | 0.2088 | 0.0000 | | | | | | |
| HCO3- | | 0.1738 | 0.1323 | 0.0000 | | | | | | |
| OH- | | 0.0000 | 0.0000 | 0.0000 | | | | | | |
| CO3-- | | 0.0747 | 0.0951 | 0.0000 | | | | | | |
| LLOAD | | 0.226 | 0.533 | 0.406 | | | | | | |

PLANT AND PROCESS FOR REMOVING CARBON DIOXIDE FROM GAS STREAMS

This application is a Divisional of U.S. Ser. No. 12/063,930, filed 18 Aug. 2008, which is a National Stage Application of PCT/AU2006/001177, filed 16 Aug. 2006, which claims benefit of U.S. Ser. No. 60/709,410, filed 18 Aug. 2005 and Serial No. 2005904432, filed 16 Aug. 2005 in Australia and which applications are incorporated herein by reference. To the extent appropriate, a claim of priority is made to each of the above disclosed applications.

BACKGROUND OF THE INVENTION

The present invention relates to a plant and process for removing carbon dioxide from industrial gas streams and effluents with a view to reducing carbon dioxide emissions to the environment.

The concentration of carbon dioxide in the atmosphere has risen from 280 parts per million to 370 parts per million over the last 150 years mainly from increased use of fossil fuels, particularly for electrical power generation and transport. However, a rapid move to meet all energy needs through alternative renewable energy sources would be very costly to consumers, damaging to the economy, and at the present time is impractical on a technology basis.

A reduction in carbon dioxide emissions will be required to stabilize, and in the long term, decrease carbon dioxide concentrations in the atmosphere. A promising technology for significantly decreasing emissions from large scale carbon dioxide emitting plants such as coal fired power stations, cement plants, gas processing facilities and iron smelting plants involve separating and capturing the carbon dioxide from the process streams, compressing the carbon dioxide and then storing the carbon dioxide in a manner that will prevent the carbon dioxide from leaking to the atmosphere.

Capturing carbon dioxide from gas streams to produce gas streams rich in carbon dioxide has been practiced in food and chemical industries for some time. For example, natural gas producers have routinely separated carbon dioxide from hydrocarbon gases which are then transported to consumers via pipeline.

In brief, technology currently used for separating carbon dioxide from gas streams include:
  physical solvents such as methanol and chemical solvents such as monoethanolamine (MEA) for absorbing carbon dioxide;
  various types of membranes for separating carbon dioxide from gases;
  absorbing carbon dioxide onto zeolites and other solids; and
  low temperature separation.

These methods can be applied to a range of industrial gas streams. However, the methods currently available are not particularly efficient for removing carbon dioxide from high volume low pressure industrial gas streams having a low concentration of carbon dioxide such as the flue gases generated by conventional coal fired and gas fired power stations. In particular, the massive volumes of flue gases generated by power stations require large capital investments to handle the flue gas which is seen as a major impediment. Another difficulty is that a large amount of energy, approximately 30-40% of the total production of a coal powered electrical generation plant would be required to release the carbon dioxide from solvents or solid absorbing mediums after separation from the flue gas. In addition, technologies such as membrane separation are yet to be adequately scaled up to the level where they can be used to capture carbon dioxide at the scale of coal fired power stations.

It is therefore an object of the present invention to provide an alternative process and plant for removing carbon dioxide from industrial gas streams.

SUMMARY OF INVENTION

The present invention is based on the realization that the carbon dioxide component of industrial gas streams can be separated from the remainder of the gas stream through the utilisation of energy in the form of sensible and/or latent heat of condensation of steam in the gas stream. For example, flue gases produced by power stations burning brown or black coal inherently contain a useful amount of energy in the form of sensible heat and the latent heat of steam that can be harnessed according to the present invention.

In particular, according to the present invention there is provided a process for removing carbon dioxide from a gas stream of a processing plant, the gas stream including steam and carbon dioxide, and the process including the steps of:
  a) extracting carbon dioxide from the gas stream by contacting the gas stream with an absorbing medium;
  b) volatilizing carbon dioxide from the absorbing medium so as to produce a product stream rich in carbon dioxide; and
  c) obtaining energy from the gas stream by condensing steam and using the latent heat of condensation as a heat source for heating the absorbing medium to assist in volatilization of carbon dioxide according to step b).

It is preferred that step c) also includes using sensible heat from the gas stream as a heat source for heating the absorbing medium.

According to the present invention there is also provided a process for removing carbon dioxide from a gas stream of a processing plant, the gas stream including steam and carbon dioxide, and the process including the steps of:
  a) extracting carbon dioxide from the gas stream by contacting the gas stream with an absorbing medium;
  b) volatilizing carbon dioxide from the absorbing medium so as to produce a product stream rich in carbon dioxide; and
  c) obtaining energy from the gas stream in the form of sensible heat from the gas stream and using the energy as a heat source for heating the absorbing medium to assist in volatilization of carbon dioxide according to step b).

It is preferred feature that step c) in the paragraph immediately above also involve obtaining energy from the gas stream by condensing steam and using the latent heat of condensation as a heat source to assist in volatilization of carbon dioxide according to step b).

One of the benefits of using the latent heat of condensation of steam and sensible heat from the gas stream as a heat source to assist in the volatilization of carbon dioxide from an absorbing medium is that it minimizes the energy required from external sources to separate carbon dioxide from the gas stream.

Throughout this specification, and unless the context requires otherwise, the term "heat" means either one or combination of latent heat of condensation of steam in the gas stream or sensible heat of the gas stream including the sensible heat from steam in the gas stream.

It will be appreciated that steps a), b) and c) of the present invention may be carried out simultaneously, consecutively or contiguously in one or more equipment items of suitable design in the processing plant. However, it is preferred that step a) be carried out in an absorber and that step b) be carried out in a stripper of the processing plant.

It is preferred that the process includes a step of recycling the absorbing medium, whereby the absorbing medium from which carbon dioxide has been volatilized in step b) is reused in contacting the gas stream according to step a).

It is preferred that the gas stream rich in carbon dioxide produced by step b) be further treated or stored to prevent leakage to the atmosphere.

It is preferred that step c) involves the latent heat of condensation or sensible heat being transferred to the absorbing medium during step a) and before volatilising carbon dioxide from the absorbing medium according to step b). Suitably, step b) is carried out in a stripper and the latent heat or sensible heat is transferred to the absorbing medium before being fed into the stripper. In addition, energy can be transferred to the absorbing medium during volatilisation of carbon dioxide according to step b).

It is preferred that step c) involves heat being transferred to the absorbing medium by any one or a combination of:
   direct heat transfer in which condensing steam directly contacts the absorbing medium in the absorber; and
   indirect heat transfer in which heat from the condensing steam is transferred to the absorbing medium via one or more intermediate heat transfer mediums.

Direct Heat Transfer

Preferably, direct heat transfer is carried out by the gas stream containing steam contacting or mixing with the absorbing medium during step a). In other words, in this situation utilizing heat energy in the gas stream including all or part of the latent heat of condensation of steam or sensible heat and extracting carbon dioxide from the gas stream according to step a) occur simultaneously, suitably, in an absorber.

It is therefore within the scope of the present invention that sensible heat from the gas stream be transferred to the absorbing medium by directly contacting the gas stream with absorbing medium. The direct heat transfer may occur by many other means such as mixing the gas stream with the absorbing medium prior to being fed into the absorber. For example, the absorbing medium and gas stream may come in contact in a cyclone separator that separates solids or other contaminants in the gas stream or any other co-current or counter-current gas liquid contacting device.

It is also preferred that a stream of the absorbing medium be discharged from the absorber and returned or recycled to the absorber via a heat exchanger network that transfers heat to absorbing medium to assist in volatilisation according to step b).

It is also preferred that said stream of absorbing medium discharged from the absorber be split in two sub-streams, whereby one of the sub-streams is recycled or returned to the absorber via the heat exchanger network and that other sub-stream is subject to volatilisation according to step b). In this situation, heat is directly transferred from the gas stream to the absorbing medium during step a) and the overall operating temperature of the absorber is at least in part controlled or managed by a portion of the stream of the absorbing medium withdrawn from the absorber being cooled and returned to the absorber.

In order to utilise the heat in volatising carbon dioxide from the absorbing medium, it is preferred that the heat be transferred via the heat exchanger network to one or more side streams of the absorbing medium withdrawn from the stripper or supplied to a re-boiler heating absorbing medium located at the base of the stripping column.

It is preferred that the exchanger network be a heat pump including a closed loop containing a heat transfer medium, such as steam, two or more heat exchangers that operate as a condenser or condensers and others that operate as an evaporator or evaporators and a compressor and associated processing equipment for pressurising the heat transfer medium. In the situation where multiple compressor stages are required, associated processing equipment may, for example, include one or more intercoolers for cooling the heat transfer medium to workable temperatures. The heat pump may also be heat integrated with other heat sources and sinks as part of an overall heat integration strategy.

In the situation where direct heat transfer is occurring, the operating temperature of the absorber may in part be controlled through the use of cooling and recycling a sub-stream of the absorbing medium to the absorber. However, the use of the heat pump or exchanger network is not an example of direct heat exchange by itself, but rather, is a technique that may be used to compliment or facilitate the use of direct heat transfer.

Indirect Heat Transfer

Indirect heat transfer involves heat being transferred from the gas stream without direct contact prior to contacting or mixing of the gas stream and the absorbing medium for the purposes of carbon dioxide removal. It is preferred that heat is transferred from the gas stream to the stream of the absorbing medium rich in carbon dioxide before the absorbing medium being treated according to step b).

The heat may be transferred to the absorbing medium in one or two stage procedures. In the case of a one stage procedure, heat is transferred by a heat exchanger from the gas stream to a stream of the absorbing medium rich in carbon dioxide that is conveyed from the absorber to the stripper prior to carbon dioxide being volatilized therefrom according to step b). In the situation where heat is transferred according to a two stage procedure, heat is transferred via a first heat exchanger from the gas stream to a stream of the absorbing medium lean in carbon dioxide that is conveyed from the stripper to the absorber and heat is transferred via a second heat exchanger from the absorbing medium stream lean in carbon dioxide to a stream rich in carbon dioxide before carbon dioxide is volatilised therefrom according to step b). Heat ultimately transferred to the absorbing medium by either one or two stage procedures assists in volatilising carbon dioxide from the absorbing medium according to step b).

It is also possible that a heat pump, as described above, may also be used to facilitate the transfer of heat to the absorbing medium to assist in the volatilisation of carbon dioxide therefrom according to step c).

In yet another example, it is possible for the gas stream to be fed through an enclosed passageway extending through the bottom of the stripper. The passageway may be defined by way of the tubes, plates or any other structural arrangement that prevents mixing of the gas stream with the absorbing medium in the stripper but allows the transfer of heat from the gas stream to the absorbing medium.

An example in which indirect heat transfer occurs between condensing steam and the absorbing medium is when the steam and absorbing medium are placed on opposite sides of a heat exchanger. In particular, it is preferred that step c) of the present invention involve feeding the gas stream to one side of a heat exchanger where steam is condensed and heat is transfer to the absorbing medium fed to the opposite side of the heat exchanger.

Moreover, it is even more preferred that step c) involves transferring heat to the absorbing medium after the absorbing medium has contacted the gas stream in step a).

In addition to using latent and sensible heat as a heat source for transferring heat to the absorbing medium, those skilled in the art of the present invention will appreciate that the temperature of the absorbing medium may also increase as a result of the heat of the reaction between carbon dioxide and the absorbing medium. However, it is envisaged that any change in the temperature of the absorbing medium caused by the heat of reaction may be relatively minor in comparison to the change in temperature of the absorbing medium attributable to the heat supplied by the gas stream.

It is preferred that step b) involves reducing the operating pressure to which absorbing medium rich in carbon dioxide is exposed so as to flash carbon dioxide from the absorbing medium.

It is even more preferred that the step b) be carried out at an operating pressure that is less than the pressure at which step a) involving the extraction of carbon dioxide from the gas stream is carried out.

It is even more preferred that the stripper be fitted with a vacuum to enable the stripper to be operated at a pressure below atmospheric pressure.

It is preferred that the absorbing medium be a solution containing an alkali carbonate such as potassium carbonate or sodium carbonate and may or may not include activators or promoters used to enhance absorption kinetics. Alkali carbonate solutions display characteristics that make them beneficial in situations where volatilization according to step c) is carried out at low pressure, as is the case for post-combustion capture of carbon dioxide from power station flue gases. Furthermore, the low volatility of the active component allows treatment at increased temperatures which allows heat, both in the form of latent heat and sensible heat at high temperatures to be used as an energy source as is the case in pre-combustion capture of carbon dioxide from synthesis gas streams.

Alternatively, the absorbing medium may be a solution containing nitrogen compounds such as amino acids and a range of amines such as monoethanolamine (MEA) as the main absorbent. In addition, the absorbing medium may also include one or more conventional activators or promoters that complement the nitrogen compounds.

When the absorbing medium is in the form of a solution containing potassium carbonate, the extraction can be operated at elevated temperatures compared to prior art processes using conventional physical and chemical solvents. The obstacle faced by some conventional solvents except for alkali carbonates is the volatility of the active component. As will be explained in more detail later in the specification, potassium or any other alkali minerals in the absorbing medium are also reactive with nitrogen compounds as well as various compounds containing sulphur such as hydrogen sulphide and $SO_x$ and, therefore, upstream processes sometimes employed to remove $SO_x$ and $NO_x$ and other sulphur or nitrogen containing compounds may be omitted from the processing plant.

We have found that the particular operating temperatures and pressures of the absorber and, in particular the stripper, have a substantial impact on the amount of useful heat that can be transferred from the gas stream to the absorbing medium. Optimal operating conditions may ultimately depend on heat integration considerations from other unit operations contained within a processing plant. The present invention is applicable to a broad range of applications involving the treatment of the industrial gas streams. Flue gasses from power stations which have been referred to above are an example of such a gas stream and in more general terms may be described as a post combustion gas stream. The present invention may also have application in removing carbon dioxide from synthesis gas streams such as those formed during coal gasification. Gasification processes involve the partial oxidation of fuel and can be carried out through either the use of air, oxygen or air enriched by oxygen to produce a combustible synthesis gas stream.

To extract the bulk of carbon from the synthesis gas stream it is subjected to a water gas shift reaction which shifts any residual carbon or carbon monoxide to carbon dioxide for separation prior to combustion or further processing.

In an industrial sense, synthesis gas streams are commonly referred to as pre-combustion gas streams and details of the present invention in relation to post-combustion and pre-combustion gas streams will now be described.

Post-Combustion Gas Stream

In the situation where the post combustion gas stream, such as a low pressure flue gas from a power station, it is preferred that the absorbing medium increase in temperature by a value ranging from 0 to 60° C. according to step c).

In the situation where the absorbing medium is in the form of a solvent solution, it is preferred that solvent solution lean in carbon dioxide and fed to an absorber so as carry out step a) have a temperature ranging from 40 to 70° C. and suitably, from 55 to 60° C.

It is preferred that the solvent solution that is rich in carbon dioxide and fed to a stripper to carry out step c) have a starting temperature ranging from 55 to 90° C., and suitably 60 to 85° C.

In the situation where the absorbing medium is a solution containing alkali carbonate, preferably potassium carbonate, and the temperature of the absorbing medium falls within the ranges set out above, it is preferred that the concentration of the potassium carbonate be in the range of 20 to 40% on a weight basis. Ultimately, the concentration of the active component of the absorbing medium, such as potassium carbonate will be based on the solubility of the material at the process operating temperatures.

It is preferred that extraction of carbon dioxide in step a) be carried out at a pressure ranging from 100 to 150 kPa absolute, suitably approximately 100 kPa (1 bar).

It is preferred that volatilization of carbon dioxide in step b) be carried out at a pressure ranging from 5 to 60 kPa absolute, suitably approximately 30 kPa (0.3 bar).

Pre-Combustion Gas Stream

Gasification processes can be operated over a broad range of pressures, typically from 2,000 to 6,500 kPa and consequently the temperature of the synthesis gas stream exiting the water gas shift reactor can vary widely, typically from 250 to 400° C. The exact operating parameters will vary depending on the oxidation method.

Hot synthesis gas streams exiting the water gas shift reactor are conventionally cooled in order to remove carbon dioxide in low temperature removal stages. The heat removal is integrated into the energy cycles of the power plant in a conventional manner.

In the situation where the absorbing medium is in the form of a solution containing an alkali carbonate, and preferably potassium carbonate, the present invention enables high temperature and pressure steam in pre-combustion gas streams to provide heat and, thereby assist in removing carbon dioxide from the absorbing medium.

In other words, in the situation where the gas stream is, for example, a pre-combustion synthesis gas, absorption of carbon dioxide in the absorber can, according to the present invention, be carried at much higher temperatures and pressures than conventional processes.

The benefits that this provides are several:

The process derives benefits from use of steam as a heat source to assist in removing carbon dioxide.

It potentially allows better heat integration within the synthesis gas generator which in turn can lead to savings in both operational and capital costs.

It allows modifications to plants such as gasifiers not previously possible due to the current low temperature constraint of the absorption stages.

It allows manipulation of the water balance around the absorber and stripper in which the extraction and volatilization steps occur.

It allows manipulation of the water balance around the absorber.

In the situation where the gas stream is a pre-combustion gas stream, it is preferred that extraction of carbon dioxide in step a) be carried out at a pressure 1,000 to 8,000 kPa, preferably ranging from 2,500 to 6,500 kPa absolute.

It is preferred that volatilization of carbon dioxide in step b) be carried out at a pressure ranging 100 to 4500 kPa, preferably ranging from 300 to 4000 kPa absolute.

It will be appreciated that the temperature and pressure at which the gas stream rich in carbon dioxide is fed to the absorber will vary to a large extent on upstream operations. Furthermore, the temperature at which the solvent or absorbing medium is fed to, and discharged from the absorber, will also depend on the upstream operations, the desired water partial pressure leaving the absorber and the energy integration across the plant. The stripper operating conditions apart from being defined by the carbon dioxide removal required will also be dependant on the energy integration across the plant. The pressure at which the carbon dioxide is provided to the product gas compressors will alter accordingly and can provide additional benefits to the overall cost of carbon dioxide capture. For example, the temperature of the gas fed to the absorber could, without limiting the possible temperatures, be in the range from forty five to several hundred degrees. Similarly, the solvent solution fed to the absorber could range from forty five to several hundred degrees Celsius.

When the absorbing medium is in the form of a solution that is lean in carbon dioxide and fed to an absorber to carry out step a), the solution fed to the absorber preferably has a starting temperature in the range of 80 to 250° C., suitably, 120 to 230° C.

When the absorbing medium is in the form of a solution and is subject to steps a) and c) simultaneously, the solution rich in carbon dioxide has a temperature ranging from 110 to 280° C.

In the situation where the absorbing medium is a solution containing alkali carbonate, preferably potassium carbonate, and the temperature of the absorbing medium falls within the ranges relating to the treatment of the pre-combustion gas stream, it is preferred that the concentration of the potassium carbonate be in the range of 30 to 60% on a weight basis. Ultimately, the concentration of the active component of the absorbing medium, such as potassium carbonate will be based on the solubility of the material and the process operating temperatures.

Irrespective of whether the gas stream being treated is a pre or post combustion gas stream, when the gas stream contains sulphur and/or nitrogen constituents and the absorbing medium is in the form of potassium carbonate, it is preferred that step a) also involves extracting sulphur and/or nitrogen containing compounds from the gas stream.

It is also preferred that the process involves discharging a product stream including potassium or any other alkali mineral and either one or a combination of sulphur and nitrogen constituents. Moreover, according to the present invention there is provided a material containing potassium and either one or a combination of sulphur and nitrogen that is, or is manufactured from, the product stream mentioned in the proceeding paragraph.

It will be appreciated the product stream and resultant material can be further processed to produce a valuable product such as agricultural fertilizers.

According to the present invention there is also provided a plant for removing carbon dioxide from a gas stream, the plant including:

a) an absorber through which the gas stream passes, wherein as the gas stream passes through the absorber carbon dioxide is extracted from the gas stream by contacting an absorbing medium such that the gas stream discharged from the absorber is relatively lean in carbon dioxide; and b) a stripper to which absorbing medium that has been loaded with carbon dioxide in the absorber is fed, and wherein carbon dioxide is volatilized from the absorbing medium in the stripper, and whereby the gas stream also includes steam and during operation of the plant, steam in the gas stream is condensed in either one or a combination of the following situations i) before the gas stream is fed to the absorber or ii) while the gas stream passes through the absorber, and the condensation of steam provides a heat source that allows heat to be transferred directly or indirectly to the absorbing medium so as to assist in the volatilization of carbon dioxide.

According to the present invention there is also provided a plant for removing carbon dioxide from a gas stream, the plant including:

a) an absorber through which the gas stream passes, wherein as the gas stream passes through the absorber carbon dioxide is extracted from the gas stream by contacting an absorbing medium such that the gas stream discharged from the absorber is relatively lean in carbon dioxide; and b) a stripper to which absorbing medium that has been loaded with carbon dioxide in the absorber is fed, and wherein carbon dioxide is volatilized from the absorbing medium in the stripper, and whereby during operation of the plant, heat energy in the form of sensible heat from the gas stream is directly or indirectly transferred to the absorbing medium so as to assist in the volatilization of carbon dioxide in the stripper.

In the situation where heat is directly transferred to the absorbing medium in order to control or manage the operating temperature of the absorber, it is preferred that a stream of the absorbing medium be discharged from the absorber and returned or recycled to the absorber after having transferred heat to absorbing medium, such as absorbing medium in a stripper to assist in the volatilisation of carbon dioxide from the absorbing medium. It is preferred that the plant include a heat pump for transferring heat to assist in the volatilisation of carbon dioxide. Preferably, the heat pump is a heat pump as described under the heading Direct Heat Transfer above.

In the situation where steam is transferred indirectly to the absorbing medium, it is preferred that the plant also include a heat exchanger and that the gas stream containing steam be fed to one side of the heat exchanger where condensation of the steam occurs and the absorbing medium be fed to the opposite side of the heat exchanger.

The absorber and stripper will preferably be operated under any one or a combination of the operating parameters described above in relation to the process of the present invention.

More particularly, in terms of the pressures at which the absorber and stripper are operated, it is preferred that the operating pressure of the stripper be less than the operating pressing of the absorber. An advantage provided by this aspect of the present invention is that an amount of carbon dioxide will be spontaneously flashed off the absorbing medium when fed into the stripper.

In the situation where the gas stream is a post combustion gas stream such as the flue gas of a coal fired power station, it is preferred that the absorber have an operating pressure ranging from 100 to 150 kPa absolute and that the stripper operate under vacuum conditions having an operating pressure ranging from 5 to 60 kPa absolute.

In the situation where the gas stream is a pre-combustion gas stream, it is preferred that the absorber have an operating pressure ranging from 2,500 to 6,500 kPa absolute and the stripper be operated at pressure ranging from 300 to 4000 kPa absolute.

Furthermore, as described above in relation to the process of the present invention, when the gas stream includes nitrogen containing compounds and sulphur containing compounds, and the absorbing medium is in the form of a alkali carbonate, suitably potassium carbonate, it is preferred that the nitrogen containing compounds or sulphur containing compounds be extracted from the gas in the absorber. A product stream including alkali salts containing nitrogen and sulphur may then be precipitated and discharged from the plant. An advantage provided is that additional upstream unit operations specifically intended for removing compounds containing nitrogen and sulphur may become redundant.

The plant of the present invention may also include any one or a combination of the features of the process of the present invention described above including:
- specific operating temperature and pressure ranges from the absorber and stripper;
- cyclone separators for removing particles or other co-current or counter-current gas liquid contactors into which the gas stream and the absorbing medium are fed and come into contact such that heat can be directly transferred therebetween;
- the absorption of contaminants including sulphur and nitrogen containing compounds from the gas stream during the direct transfer of heat to the absorbing medium; and
- heat exchanger networks including exchangers and/or heat pumps for directly and indirectly transferring heat from the gas stream to the absorbing medium.

BRIEF DESCRIPTION OF THE DRAWINGS

The present invention will now be described with reference to the accompanying drawings, of which:

FIGS. 4 and 6 are tables providing thermodynamic properties and compositions of the streams shown in FIGS. 3 and 5;

FIGS. 8 and 10 are tables providing thermodynamic properties and compositions of the streams shown in FIGS. 7 and 9;

FIG. 12 provides the thermodynamic properties and compositions of the streams shown in FIG. 13.

DETAILED DESCRIPTION

The flow sheet shown in FIG. 2 and the example flow sheets shown in FIGS. 3, 5, 7, 9, 11 and 13 include a number of features that are the same or substantially identical, and for convenience these features will only be described with reference to FIG. 2.

As will be explained in the more detail below, the preferred embodiment and examples shown in the Figures are unlikely to exist in isolation and in reality would be integrated, using techniques such as Pinch Analysis, into a processing plant such as coal or gas fired power station, a cement plant or natural gas production plant or any other industrial source of carbon dioxide. However, for the purpose of describing the present invention, the processes shown in the figures will now be described with reference to the flow sheets shown in the figures.

Figure 1:
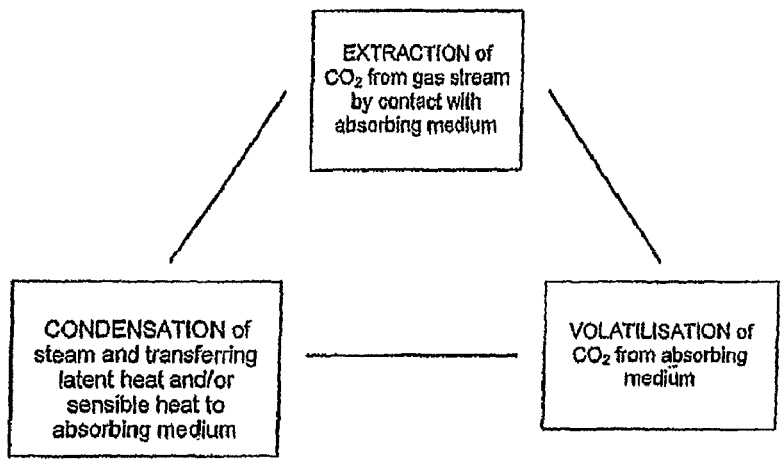
FIG. 1 is a block diagram schematically illustrating three steps of a process according to an embodiment of the present invention.
Figure 2:
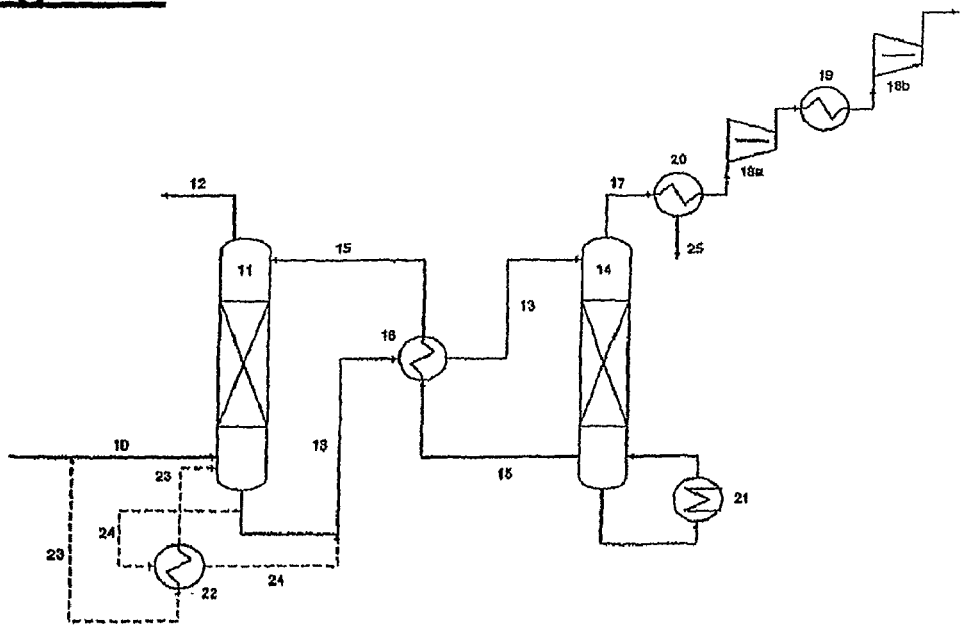
FIG. 2 is a base flow sheet according to a preferred embodiment for carrying out the process shown in FIG. 1.

With reference to FIG. 2, the preferred embodiment includes feeding a gas stream, suitably a low pressure flue gas of a power station containing carbon dioxide into the bottom of an absorption column 11 as indicated by solid line 10. The absorption column 11 is adapted to maximise contact between the gas stream and an absorbing medium and may, for example, be a packed column, a column containing trays or any other gas/liquid contacting device. The absorption medium, preferably in the form of a solution of potassium carbonate is fed into the top of the absorption column 11 as stream 15 and flows downwardly in the column in counter current flow to the gas stream. The absorption medium extracts carbon dioxide from the gas stream and a product gas stream 12 substantially free of carbon dioxide is discharged from the top of the absorption column 11. Depending on the intended purpose of the product gas stream 12, the gas stream 12 can be further processed and/or discharged into the atmosphere as desired. In any event, a purpose of the absorption column 11 is to reduce the level of carbon dioxide in the gas stream and, thus, the overall carbon dioxide emissions to the atmosphere.

A solvent solution stream 13 rich in carbon dioxide is discharged from the base of the absorption column 11 and fed into the top of a stripping column 14 where carbon dioxide is volatilized from the solvent solution and a stream of the solvent solution 15 lean in carbon dioxide is discharged from the base of the stripping column 14 and recycled to the absorption column 11 where it is again contacted with the gas stream. As can be seen in FIG. 2, a heat exchanger may be used to transfer heat between streams 13 and 15. Specifically, in order to assist in the volatilization of carbon dioxide in the stripping column 15, heat may be transferred from stream 15 lean in carbon dioxide to stream 13 rich in carbon dioxide.

A product gas stream 17 rich in carbon dioxide is discharged from the top of the stripping column 14 and is cooled in a reflux heat exchanger 20 in which water is condensed to form a water product stream 25. The cooled gas stream is then fed into a multi-stage compressor 18a and 18b which may be designed to induce a vacuum in stripping column 14. The water product stream 25 may, in part, or in its entirety, be returned to the plant including the absorption and stripping columns 11 and 14. The rate at which water is returned or withdrawn from the plant will depend on a number of plant operation factors including the rate at which the steam of stream 10 is condensed in absorption column 11.

The base of the stripping column 14 may also include a conventional re-boiler 21 that supplies heat to the solvent solution in order to volatilize residual carbon dioxide in the solvent solution.

According to the preferred embodiment of the present invention, steam in the processing gas stream is retained and condensed such that the latent heat of condensation is used as a heat source for transferring heat directly or indirectly to the solvent solution or the stripper directly to reduce the energy that must be supplied by the re-boiler 21. In addition, as will be explained in greater detail with reference to the examples, heat from the gas stream may also be transferred to the solvent solution by direct or indirect methods either with or without the condensation of steam. In the situation where latent heat is directly transferred to the solvent solution, the steam is condensed in the absorption column 11 and the condensed steam is discharged from the absorption column 11 with the solvent solution. In the situation where at least part of the heat is indirectly transferred to the solvent solution, the gas stream 10 containing carbon dioxide and steam is split or redirected so as to pass through one side of a condenser heat exchanger 22, as shown by dotted lines 23, and the stream of solvent solution 13 rich in carbon dioxide also be split or redirected and fed through the opposite side of the condenser 22, as shown by dotted line 24, prior to being fed into the stripping column 14.

Although not shown in FIG. 2, it will be appreciated by those skilled in the art of the present invention that one or more side streams may also be withdrawn from the absorber 11, or the stripping column 14 and depending on overall heat integration options, have heat exchanged with other appropriate streams.

In the situation where the gas stream 10 is a flue gas produced through the combustion of black or brown coal, or gas it is envisaged that the absorption solution would be fed into the absorption column 11 at a temperature ranging from 45 to 60° C. and that steam in the gas stream would be condensed in the absorption column 11 may cause the temperature of the absorption solution to increase preferably by at least 25° C. In other words, the temperature of absorption solution stream 13 rich in carbon dioxide discharged from the stripping column could range from 55 to 90° C.

Moreover, in order to further reduce the amount of energy that must be supplied by the re-boiler in order to volatilize carbon dioxide from the absorption solution, it is preferred that the stripping column 14 be operated at an operating pressure that is less than the operating pressure of the absorbing column 11. More particularly, in the situation where the gas stream being fed to the absorption column 11 is a flue gas produced by a brown coal, black coal or gas fired powered station, it is preferred that the absorption column 11 be operated at a pressure ranging from 100 to 150 kPa absolute and that the stripping column 14 be operated at a pressure ranging from 5 to 60 kPa absolute.

The present invention is based on the realisation that the steam component of the process gas stream and the sensible heat can be utilised so as to reduce the overall amount of energy which must be supplied by the re-boiler 21 of the stripping column 14. According to conventional processes, it is common for steam to be removed or condensed from process gas streams in upstream processing operations. For example, it is common practice to remove steam from flue gases produced by coal fired power stations during scrubbing operations to extract environmentally harmful $SO_x$ and $NO_x$ constituents before discharge via a stack.

However, one of the advantages in using a potassium carbonate solvent solution rather than the traditional amine solvent is that potassium carbonate will, in addition to reacting with carbon dioxide, also react with hydrogen sulphide, $SO_x$, $NO_x$ and other nitrogen constituents and thereby reduce or even eliminate the need for conventional scrubbing stages for removing hydrogen sulphide, $SO_x$, $NO_x$ or nitrogen compounds from the gas stream. Therefore, in the event that the gas stream fed to the absorption column 11 contains sulphur and/or nitrogen reactive constituents and the solvent is in the form of potassium carbonate, to avoid an accumulation of sulphur or nitrogen in the plant, a by-product stream can be discharged and fresh makeup potassium carbonate or potassium hydroxide can be added to plant.

The by-product stream containing potassium and either one or a combination of sulphur or potassium can be further processed to produce valuable material such as fertilizer.

EXAMPLES

The following examples relate to flow sheets involving the use of un-promoted potassium carbonates solvents. However as explained above, it is within the scope of the present invention that the absorbing medium may contain any one or a combination of the active components including, but by no mean limited to, alkali carbonates, amino acids and amines, wherein the active components may be either promoted or un-promoted.

Figure 3:
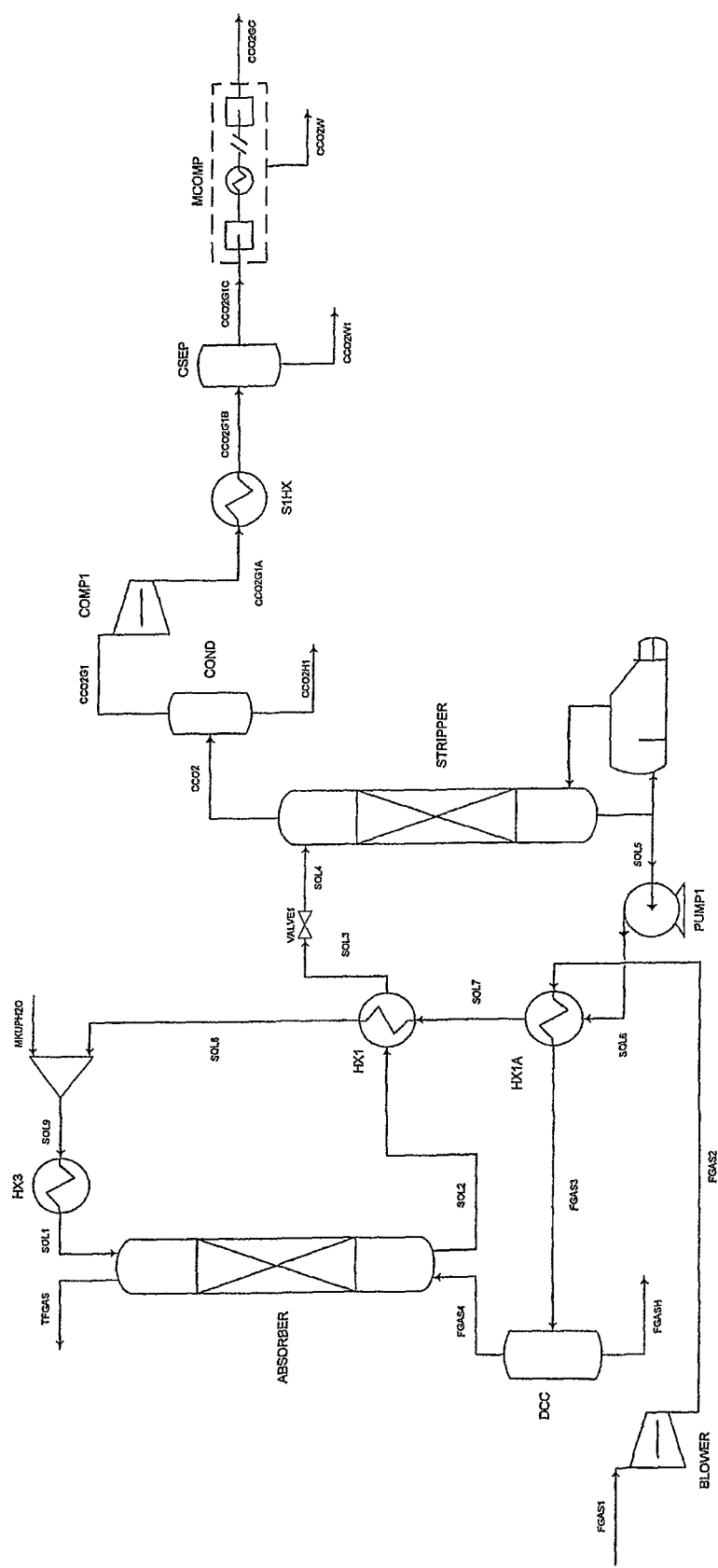
FIGS. 3 and 5 are examples of flow sheets for treating a post-combustion gas stream in the form of flue gas from a coal fired power station, the flow sheets involve the indirect transfer of sensible heat from the flue gas to a solvent solution.

FIGS. 3 and 4

The flow sheet shown in FIG. 3 is similar to the flow sheet shown in FIG. 2 and includes an absorber, stripper and reboiler and a number of other unit operations specific for handling flue gases from a brown coal fired power station such as a blower. By way of summary, a flue gas stream identified as FGAS4 is feed into the absorber after having being pre-treated in a direct contact cooler (DCC) which is essentially a knock out pot to remove condensed water and a heat exchanger HX1A. Treated flue gas lean in carbon dioxide is discharged from the absorber as stream TFGAS and a solvent stream that is lean in carbon dioxide is fed to the absorber as stream SOL1 and a solvent stream that is rich in carbon dioxide is fed to the absorber as stream SOL2. Stream SOL4 rich in carbon dioxide is fed in the stripper via a throttling valve and stream SOL5 lean in carbon dioxide is returned to the absorber via heat exchangers HX1A, HX1 and HX3. A stream rich in carbon dioxide is discharged from the stripper stream CCO2.

FIG. 3 is an example in which sensible heat in the flue gas is utilised to heat a loaded solvent stream, namely SOL2 via heat exchangers HX1A and HX1. As can be seen from FIG. 4, the temperature of the flue gas reduces from 185° C. to 92° C. before being feed into the DCC unit to condense remaining water from the flue gas before treatment in the absorber. By way of comparison in the situation where stream FGAS1 is fed directly into the DDC and bypasses the heat exchanger HX1A the duty of the reboiler is approximately 4.02 MJ/kg of carbon dioxide captured. In contrast, by virtue of the utilising available heat in the manner shown in the FIG. 3, the heat duty of the reboiler can be reduced to approximately 3.91 MJ/kg of carbon dioxide captured.

The stream compositions provided in FIG. 4 do not include details of contaminants such as sulphur containing compounds. The reality is that the untreated flue gas stream will include from 150 to several thousand parts per million of sulphur containing compounds. In the past, the removal of the sulphur compounds required the inclusion of flue gas desulphurisation plants which substantially removes the steam component from the flue gas stream. Removal of sulphur in the manner of the current invention can utilise the steam and avoid reducing the need for such equipment.

In this instance, the chosen solvent is potassium carbonate, and salts thereof are included in the stream composition in FIG. 4. Other solvents as described earlier may equally be employed to carry out the function of the solvent, although the benefits of sulphur removal may be lost with materials other than alkali carbonates.

In addition, in terms of operation of the flow sheet shown in FIG. 3, controlling the rate at which water is purged or discharged from flow sheet is important and is managed by the amount of water supplied to the absorber via stream MKUPH20, discharged via stream FGASH, stream CCO2H1, stream CCO2W1 and stream CCO2W.

Figure 5:
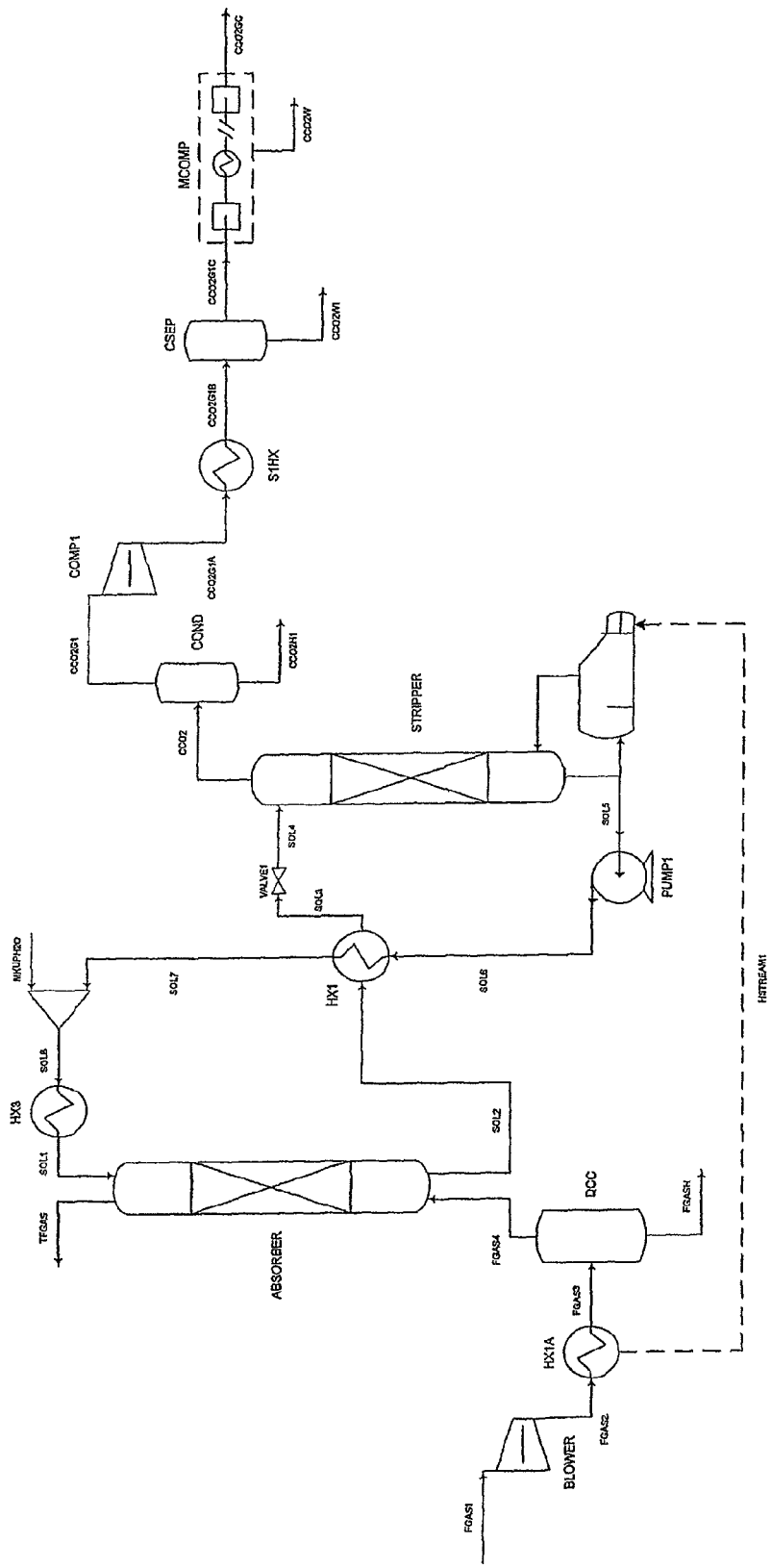

FIGS. 5 and 6

The flow sheet shown in FIG. 5 is substantially the same as the flow sheet shown in FIG. 3, save for heat exchanger HX1A being configured to provide heat to the reboiler as shown by dashed line HSTREAM1 rather than to the solvent solution stream SOL2 that is lean in carbon dioxide. The heat duty transferred to the reboiler indicted by HSTREAM 1 may be implemented by any means such as conveying a fluid between the exchanger HX1A and the reboiler. The energy supplied by HSTREAM1 equals 0.54 MJ/kg of carbon dioxide captured and the heat duty of the reboiler QREB=3.48 MJ/kg of carbon dioxide captured. That is, a reduction of 0.43 MJ/kg of carbon dioxide captured compared to the reboiler in the flow sheet shown in FIG. 3.

Figure 7:
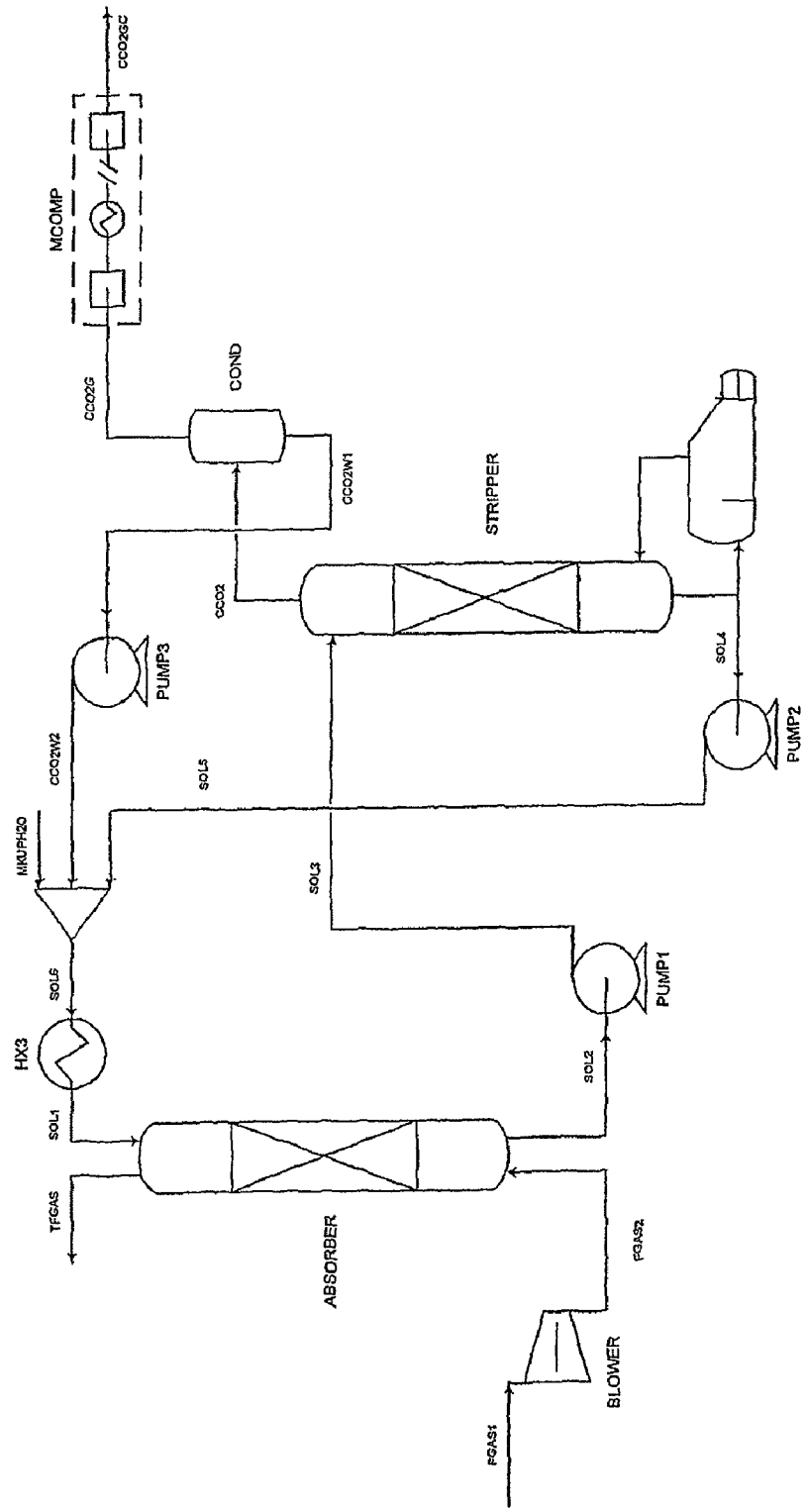
FIGS. 7 and 9 are examples of flow sheets for treating a post-combustion gas stream in the form of flue gas from a coal fired power station, the flow sheets involving the direct transfer of sensible heat of the flue gas and latent heat of condensation of steam in the flue gas to a solvent solution.

FIGS. 7 and 8

The flow sheet shown in FIG. 7 is substantially the same as the flow sheet shown in FIG. 2, save for the absence of a heat exchanger. Specifically, this flow sheet is an example in which the latent heat of condensation and sensible heat are directly transferred from the flue gas to the solvent solution by way of contact of the two streams in the absorber. During operation the flue gas FGAS2 enters the absorber at 170° C. and is discharged from the absorber as stream TFGAS at approximately 68.6° C. Heat transferred to the solvent solution causes the solvent to increase in temperature from 55° C. to 78.5° C. Solvent solution rich in carbon dioxide at 78.5° C. is fed directly into the stripper operating at a reduced pressure of 0.3 bar.

The heat duty of the reboiler QREB=5.80 MJ/kg of carbon dioxide captured.

Figure 9:
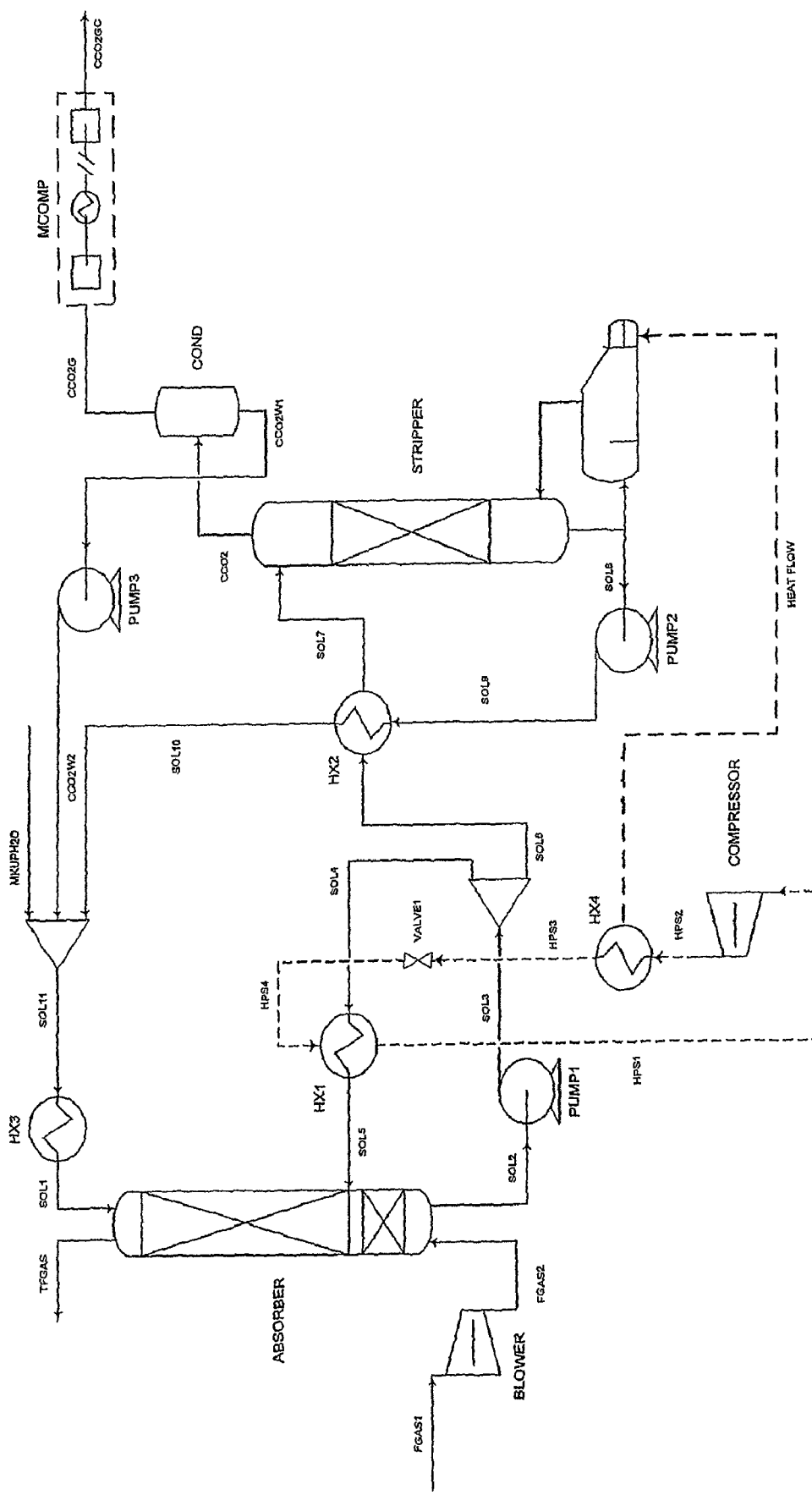

FIGS. 9 and 10

The flow sheet shown in FIG. 9 is similar to the flow sheet shown in FIG. 7 in the sense that the sensible and latent heats are directly transferred from the flue gas FGAS2 to the solvent solution in the absorber. In addition, in order to further enhance the utilisation of heat in the flue gas and control the operating temperature of the absorber, stream SOL3 rich in carbon dioxide discharged from the absorber is split into two stream SOL4 which is cooled via heat exchanger HX1 before being returned to the absorber and SOL5 which is heated via heat exchanger HX2 before being fed in the stripper. Heat exchanger HX1 forms part of the a heat pump arrangement that can be used to supplement the heat duty of the reboiler of the stripper and, wherein heat exchangers HX1 and HX4 perform the function of an evaporator and condenser respectively. Details of the heat pump arrangement including the thermodynamic properties of the streams of the heat pump are shown in FIG. 12. Although the heat pump illustrated in FIG. 9 includes a single compressor and single heat exchangers representing an evaporator and condenser, it will be appreciated that multiple evaporators or condensers may be required and that the temperature profile across the compressor may require compression step to be carried out in multiple stages with inter-cooling.

Figure 11:
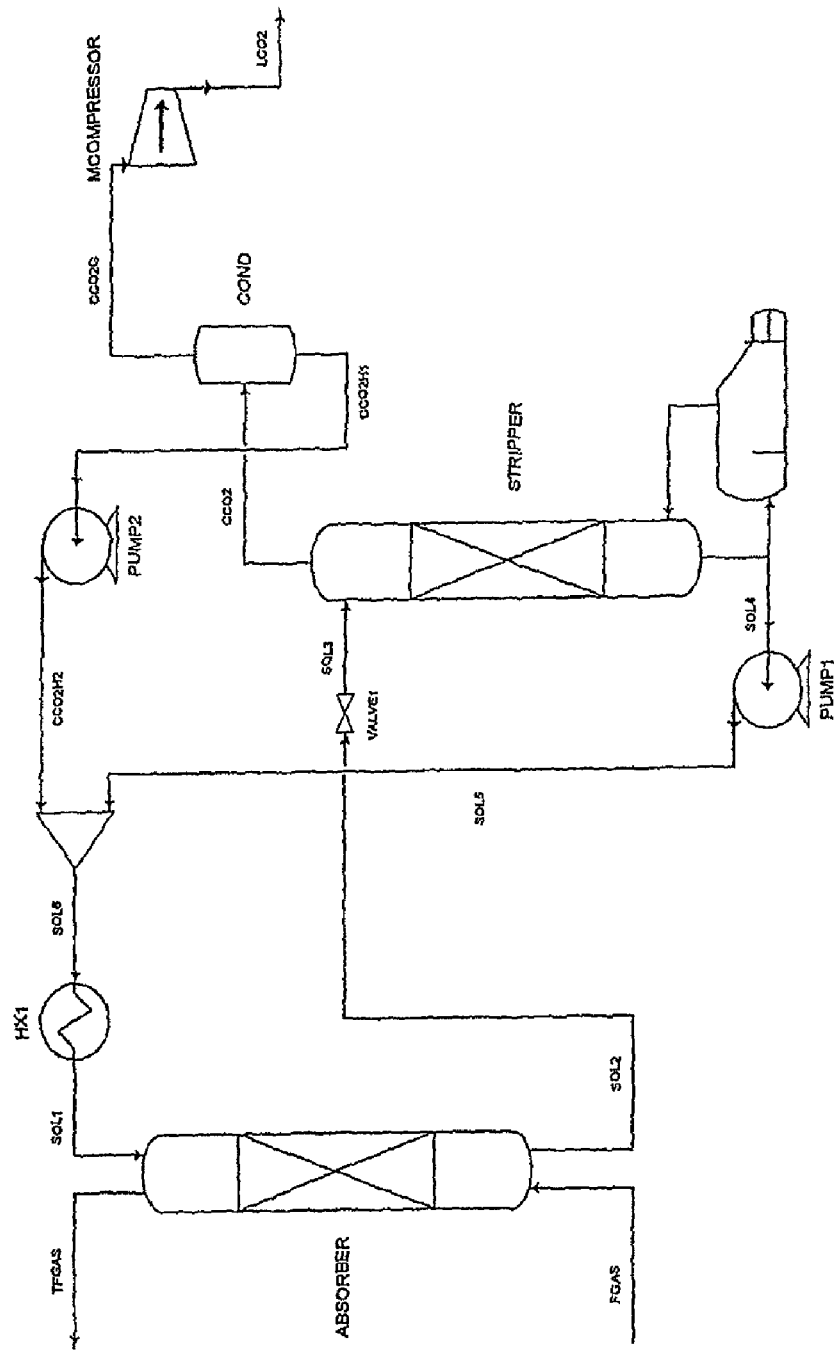
FIG. 11 an example of a flow sheet for treating a pre-combustion gas stream such as that produced by an air-blown gasification plant, the flow sheet involving the direct transfer of sensible heat of the gas stream and latent heat of condensation of the steam to a solvent solution.

FIGS. 11 and 12

The flow sheet shown in FIG. 13 is an example of a process in which heat energy, including latent and sensible heat from the feed gas stream is transferred to the solvent solution in the absorber which in turn reduces the heat load of the reboiler of the stripper and controls the water load in the exhaust gas from the absorber, namely stream TFGAS.

The feed gas stream, identified as FGAS, is a synthesis gas stream such as that produced by an air-blown gasification plant. It is preferable for downstream handling that the level of carbon dioxide in the gas stream be reduced and the partial pressure of water is controlled.

FIG. 11 is an example, in which stream FGAS, which is available at elevated pressure and temperature and contains approximately 15% by mass of saturated steam is fed into the absorber such that at least part of the steam component is condensed in the absorber. By simple analysis of the values provided in FIG. 12, approximately 185.1 tons/hr of steam enter the absorber via stream FGAS and leaves the absorber in a gas phase as stream TFGAS at a rate of 88.7 tons/hr. This equates to a substantial amount of heat energy that is transferred to the solvent and is largely responsible for increasing the temperature of the solvent across the absorber by 30° C., see streams SOL1 and SOL2 in FIG. 12. Condensation of steam in the absorber combined with the stripper being operated at a lower operating pressure enables the heat energy obtained form the steam to ultimately be able to assist in volatilisation of carbon dioxide from the solvent in the stripper.

By control of the lean solvent temperature, stream SOL1, the amount of water removed can be controlled for the purposes of energy needed and water partial pressure in the gas stream.

The stream compositions provided in the FIG. 12 do not include details of components such as sulphur, the reality is that the FGAS stream will include from 100 to several thousand ppm of sulphur compounds as well as nitrogen compounds.

In this instance, the chosen solvent is potassium carbonate, and salts thereof are included in the stream compositions in FIG. 12. Potassium carbonate, or any other non-volatile solvent such as sodium carbonate, may equally be employed to remove carbon dioxide, sulphur and nitrogen compounds to varying degrees.

In addition, in terms of operation of the flow sheet shown in FIG. 12, controlling the rate at which water is purged or discharged is important and it is related to the rate of condensation of steam from the FGAS stream. In the case of the flow sheet provided in FIG. 11, the rate at which water is purged or discharged is controlled by the temperature of lean solvent stream, which being higher than any other previous operation known to us, is unique to this process.

In the current example, the utilization of the steam from the FGAS stream in accordance with this example reduces the heat duty of the reboiler to 2.68 MJ/kg of $CO_2$ captured. The energy integration of such plants are highly dependent on the respective process conditions and will vary widely.

Those skilled in the art of the present invention will appreciate that many modifications and variations may be made to the preferred embodiment described above without departing from the spirit and scope of the present invention.

For example, depending on overall heat demands of a processing plant such as a coal fired power station, it is possible that heat from any one or more of the following additional sources may also be utilised to further reduce the overall amount of energy that must be supplied by the re-boiler 21 (in FIG. 2) of the absorption solution:

energy from the reflux condenser 20 (in FIG. 2);
energy from multi-stage compressor intercoolers 19 (in FIG. 2);
a lean solvent cooler; and
and other energy sources available when the preferred embodiment is integrated into a power plant such as boiler feed water of the base power plant and or other auxiliary power plants needed to supplement power to run a carbon dioxide capture plant.

The energy integration will take into account all heat sources and sinks and, preferably, implement a minimum energy system using technologies such as pinch technology.

The claims defining the invention are as follows:

1. A process that removes carbon dioxide from a pre-combustion gas stream of a processing plant, the gas stream including steam and carbon dioxide, the process including the steps of:
   a) extracting carbon dioxide from the gas stream by contacting the gas stream with an absorbing medium in the form of an alkali carbonate absorbent solution so as to produce a gas stream lean in carbon dioxide;
   b) volatilizing carbon dioxide from the absorbing medium so as to produce a product stream rich in carbon dioxide;
   c) obtaining energy from the gas stream in the form of either one or a combination of i) sensible heat from the gas stream and/or ii) latent heat obtained by condensing steam and using the energy as a heat source to assist in volatilization of carbon dioxide according to step b); and
   d) controlling the temperature of the absorbing medium fed to an absorber in which step a) is being carried out to a starting temperature in the range of 120 to 250° C. and, in turn, control partial pressure (or mass fraction) of water of the gas stream lean in carbon dioxide;
   wherein step a) is carried out at a pressure ranging from 1,000 to 8,000 kPa absolute.

2. The process according to claim 1, wherein step c) involves heat being transferred to the absorbing medium before volatilizing carbon dioxide from the absorbing medium according to step b).

3. The process according to claim 1, wherein step b) is carried out in a stripper and that heat is transferred to the absorbing medium before the absorbing medium is fed into the stripper.

4. The process according to claim 1, wherein step c) involves heat being transferred to the absorbing medium by direct heat transfer in which the gas stream directly contacts the absorbing medium.

5. The process according to claim 4, wherein the gas stream and the absorbing medium are mixed in an absorber or any other another vessel.

6. The process according to claim 4, wherein a stream of absorbing medium is discharged from an absorber in which step a) is carried out and is returned or recycled to the absorber via a heat exchanger network that transfers heat to absorbing medium to assist in the volatilization of carbon dioxide in according to step b).

7. The process according to claim 6 wherein said stream of absorbing medium discharged from the absorber is split into two sub-streams, whereby one of the sub-streams is recycled or returned to the absorber via the heat exchanger network and whereby the other sub-stream is subject to volatilization according to step b).

8. The process according to claim 6 wherein heat is transferred via the heat exchanger network to one or more side streams of the absorbing medium withdrawn from a stripper or supplied to a re-boiler heating absorbing medium located at the base of the stripper.

9. The process according to claim 6 wherein the exchanger network is a heat pump including a closed loop containing a heat transfer medium, two or more than two heat exchangers that operate as a condenser or condensers and an evaporator or evaporators and a compressor for pressurizing the heat transfer medium.

10. The process according to claim 1, wherein step c) involves heat being transferred to the absorbing medium by indirect heat transfer in which heat is transferred to the absorbing medium via one or more intermediate heat transfer mediums.

11. The process according to claim 10, wherein heat is transferred by a heat exchanger from the gas stream to a stream of the absorbing medium rich in carbon dioxide that is conveyed from the absorber to a stripper.

12. The process according to claim 10, wherein heat is transferred via a first heat exchanger from the gas stream to a stream of the absorbing medium lean in carbon dioxide that is conveyed from a stripper to the absorber and heat is transferred via a second heat exchanger from the absorbing medium stream lean in carbon dioxide that has been heated in the first heat exchanger to the product stream rich in carbon dioxide that is fed to the stripper.

13. The process according to claim 1, wherein step a) involves increasing the temperature of the absorbing medium by a value ranging from 1 to 55° C.

14. The process according to claim 1, wherein step b) involves reducing the operating pressure to which absorbing medium rich in carbon dioxide is exposed so as to flash carbon dioxide from the absorbing medium.

15. The process according to claim 1, wherein step b) is carried out at an operating pressure that is less than the pressure at which step a) involving the extraction of carbon dioxide from the gas stream is carried out.

16. The process according to claim 15, wherein when the absorbing medium is in the form of a solution and the solution has been subjected to steps a) and c) simultaneously, the solution has a temperature ranging from 120 to 280° C.

17. The process according to claim 15, wherein the absorbing medium is a solvent solution containing potassium carbonate in the range of 30 to 60% on a weight basis.

18. The process according to claim 1, wherein the extraction of carbon dioxide in step a) is carried out at a pressure ranging from 2,500 to 6,500 kPa absolute (25 to 65 bar).

19. The process according to claim 1, wherein the volatilization of carbon dioxide in step b) is carried out at a pressure ranging from 100 to 4500 kPa absolute (1 to 45 bar).

20. The process according to claim 1, wherein the volatilization of carbon dioxide in step b) is carried out at a pressure ranging from 300 to 4000 kPa absolute (3 to 40 bar).

21. The process according to claim 1, wherein the process includes the step of recycling the absorbing medium, whereby the absorbing medium from which carbon dioxide has been volatilized in step b) is reused in contacting the gas stream according to step a).

22. The process according to claim 1, wherein step a) includes extracting from the gas stream, in addition to carbon dioxide, either one or a combination of sulphur containing compounds and/or nitrogen containing compounds, and a step of discharging a by-product stream containing the absorbent solution and either one or a combination of sulphur and nitrogen containing compounds.

23. A process that removes carbon dioxide and either one or a combination of sulphur containing compounds and/or nitrogen containing compounds from a gas stream of a processing plant, the process including the steps of:
   a) extracting carbon dioxide and either one or a combination of sulphur containing compounds and/or nitrogen containing compounds from the gas stream by contacting the gas stream with an alkali carbonate absorbent solution so as to produce a lean gas stream;
   b) volatilizing carbon dioxide from the absorbent so as to produce a product stream rich in carbon dioxide;
   c) obtaining energy from the gas stream in the form of either one or a combination of i) sensible heat from the gas stream and/or ii) latent heat obtained by condensing steam and using the energy as a heat source to assist in volatilization of carbon dioxide according to step b);
   d) controlling the temperature of the absorbing medium fed to an absorber in which step a) is being carried out to a starting temperature in the range of 120 to 250° C. and, in turn, control partial pressure (or mass fraction) of water of the lean gas stream;
   e) discharging a by-product stream containing the absorbent solution and either one or a combination of sulphur and nitrogen containing compounds; and
   f) adding a makeup stream containing fresh alkali mineral to the absorbent;
   wherein step a) is carried out at a pressure ranging from 1,000 to 8,000 kPa absolute.

24. The process according to claim 23, wherein the absorbent is a solvent solution containing potassium carbonate in the range of 30 to 60% on a weight basis, and the by-product stream contains potassium and either one or a combination of sulphur containing compounds or nitrogen containing compounds.

25. The process according to claim 24, wherein the makeup stream of step f) includes potassium carbonate or potassium hydroxide.

26. The process according to claim 25, wherein the absorbent is a solvent solution containing potassium carbonate, and the by-product contains potassium and either one or a combination of sulphur containing compounds or nitrogen containing compounds.

* * * * *